(12) United States Patent
Bowman et al.

(10) Patent No.: US 6,693,811 B1
(45) Date of Patent: Feb. 17, 2004

(54) INTEGRATED CONTROLLER, METHOD OF OPERATION THEREOF AND POWER SUPPLY EMPLOYING THE SAME

(75) Inventors: Wayne C. Bowman, Allen, TX (US); Thomas G. Wang, Plano, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 35 days.

(21) Appl. No.: 10/187,639

(22) Filed: Jul. 2, 2002

(51) Int. Cl.[7] .............................. H02M 5/42; H02M 3/24
(52) U.S. Cl. .............................. 363/97; 363/49; 363/41; 363/21.11; 363/21.18; 363/56.09
(58) Field of Search .............................. 363/21.01, 21.1, 363/21.11, 21.18, 26, 40, 41, 49, 56.01, 56.09, 97, 131

(56) References Cited

U.S. PATENT DOCUMENTS 5,903,451 A * 5/1999 Wu et al. ...................... 363/49
6,215,680 B1 * 4/2001 Rolston ....................... 363/133
6,414,860 B1 * 7/2002 Li .............................. 363/49

* cited by examiner

Primary Examiner—Jessica Han

(57) ABSTRACT

The present invention provides an integrated controller for use with a power supply employing a pulse width modulator and a method of operation thereof. In one embodiment, the integrated controller includes a primary control circuit configured to provide a control signal to the pulse width modulator. Additionally, the integrated controller includes a feedback circuit configured to monitor an output signal of the pulse width modulator and to modify the control signal thereby enabling a substantially monotonic increase in an output voltage of the power supply output voltage during a non-steady state period of operation thereof.

20 Claims, 4 Drawing Sheets

INTEGRATED CONTROLLER, METHOD OF OPERATION THEREOF AND POWER SUPPLY EMPLOYING THE SAME

TECHNICAL FIELD OF THE INVENTION

The present invention is directed, in general, to power electronics and, more specifically, to an integrated controller, method of operation thereof and a power supply employing the same.

BACKGROUND OF THE INVENTION

The electronics industry continues to develop smaller equipment that performs more functions, which in turn may require increasingly more power from smaller, more compact power supplies. Additionally, such a power supply may also have internal bias supply requirements for additional voltages that are usually different from the main power supply voltages. Bias supplies are used in power supplies to provide operating voltages needed by internal power control circuits or other circuits that provide a proper operation during start-up or sustained power supply operation. The bias supply voltages and power requirements provided by the bias supplies typically add another level of complexity to an already demanding environment.

A safety requirement to isolate various portions of a power supply, such as an input section from an output section, represents one of these levels of complexity to both the generation and use of bias supply voltages associated with the bias supplies. A conventional approach to providing appropriately isolated bias supply voltages is to use one or more independent or separate bias supplies to provide the bias voltages needed. However, independent bias supplies tend to reduce overall efficiency and to increase both costs and size of a power supply. Unfortunately, users are demanding increased efficiency, reduced costs and smaller sizes, which are attributes contrary to the employment of independent bias supplies and therefore, make them somewhat unattractive.

The operational requirements of semiconductor devices that employ power supplies have also continued to escalate. This is especially true with regard to transient power supply situations that affect power supply output voltage characteristics. Conventional, non-independent bias supply solutions often suffer from start-up characteristics that produce inflection points in an output voltage characteristic. One such characteristic may be a voltage that first rises, then falls and finally rises again while always remaining positive. Many semiconductor devices, subjected to such an output voltage characteristic, will latch-up or otherwise become inoperative thereby making such a voltage characteristic unacceptable.

Accordingly, what is needed in the art is a way to provide a power supply output voltage that increases smoothly during start-up and other situations without employing independent bias supplies.

SUMMARY OF THE INVENTION

To address the above-discussed deficiencies of the prior art, the present invention provides an integrated controller for use with a power supply employing a pulse width modulator. In one embodiment, the integrated controller includes a primary control circuit configured to provide a control signal to the pulse width modulator. Additionally, the integrated controller includes a feedback circuit configured to monitor an output signal of the pulse width modulator and to modify the control signal thereby enabling a substantially monotonic increase in an output voltage of the power supply during a non-steady state period of operation thereof.

In another aspect, the present invention provides a method of operating a power supply employing a pulse width modulator. In one embodiment, the method includes providing a control signal to the pulse width modulator. The method also includes monitoring an output signal of the pulse width modulator, and modifying the control signal to enable a substantially monotonic increase in an output voltage of the power supply during a non-steady state period of operation thereof.

The present invention also provides, in yet another aspect, a power supply employing a power stage that provides an output voltage and a pulse width modulator that provides an output signal to a power switch of the power stage. The power supply also employs an integrated controller that includes a primary control circuit that provides a control signal to the pulse width modulator, and a feedback circuit that monitors the output signal of the pulse width modulator and modifies the control signal to enable a substantially monotonic increase in the output voltage during a non-steady state period of operation of the power supply. Additionally, the power supply further employs a secondary control circuit that is coupled to an output of the power supply and coupled to the integrated controller.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
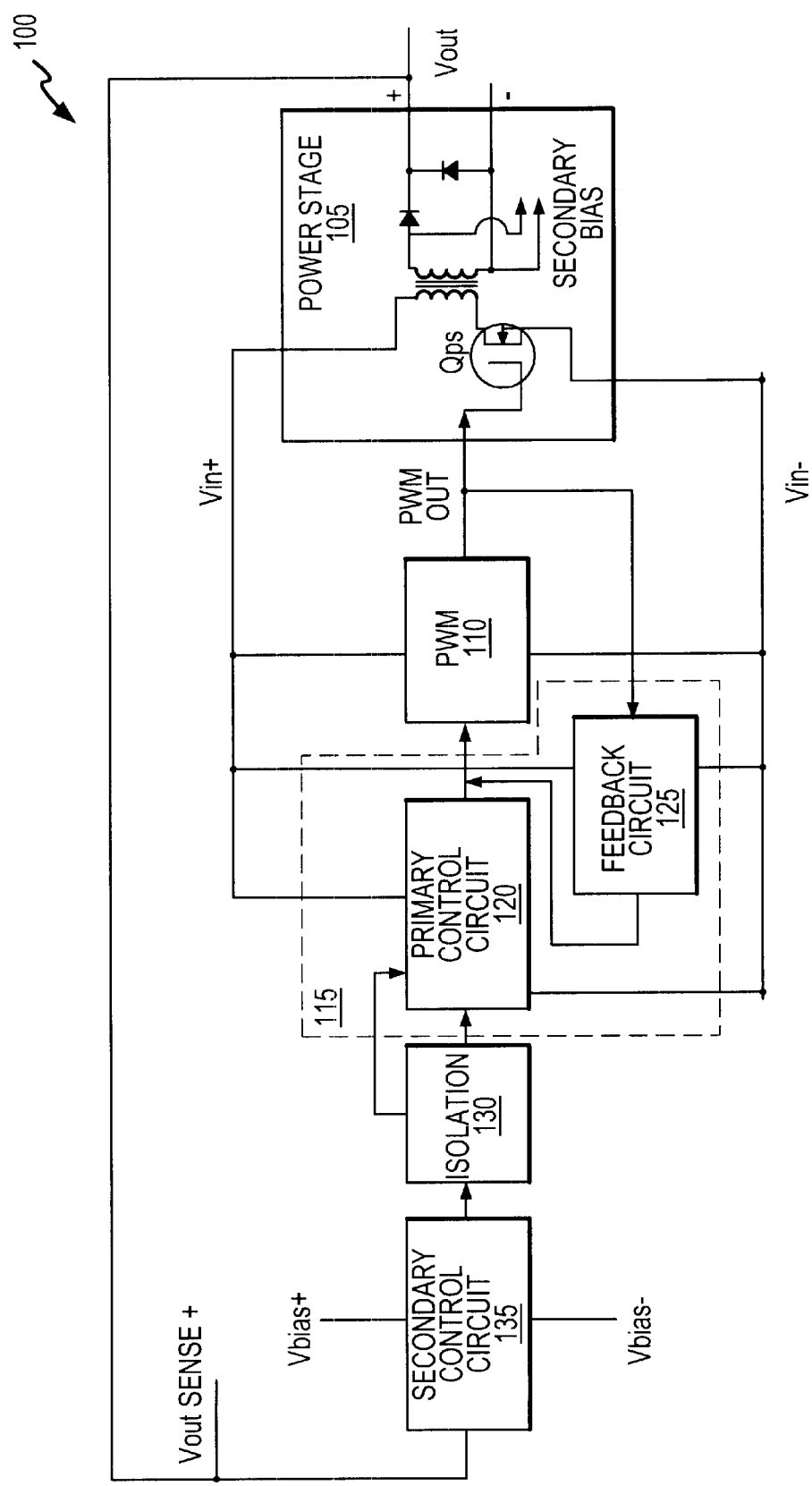
FIG. 1 illustrates a block diagram of an embodiment of a power supply constructed in accordance with the principles of the present invention.

Referring initially to FIG. 1, illustrated is a block diagram of an embodiment of a power supply, generally designated 100, constructed in accordance with the principles of the present invention. The power supply 100 includes a power stage 105 that provides a power supply output voltage Vout and a pulse width modulator 110 that provides an output signal to a power switch Qps of the power stage 105. The power supply 100 also includes an integrated controller 115.

The integrated controller 115 includes a primary control circuit 120 that provides a control signal to the pulse width modulator 110. The integrated controller 115 also includes a feedback circuit 125 that monitors the output signal (e.g., output signal voltage) of the pulse width modulator 110 and modifies the control signal provided by the primary control signal 120. This signal will modify the control signal to enable a substantially monotonic increase in the power supply output voltage Vout during a non-steady state period of operation of the power supply 100. The power supply 100 further includes a secondary control circuit 135 that is coupled to an output of the power supply 100 and coupled (e.g., optically coupled) to the integrated controller 115 by an isolation circuit 130.

A steady state period of operation of the power supply 100 may be defined as a period when the power supply output voltage Vout is being regulated within its nominal voltage range as output current load conditions vary within a rated or a specified range. This range typically encompasses conditions from a no-load output current to maximum-allowable or rated-load output current. In the steady state mode of operation, a control loop is formed employing the power stage 105, the pulse width modulator 110, the primary control circuit 120, the isolation circuit 130 and the secondary control 135.

In this operating control mode, the power supply output voltage Vout is fed back to an input of the secondary control circuit 135, which then provides an optical signal through the isolation circuit 130 to the primary control circuit 120. The primary control circuit 120 then provides a control signal to the pulse width modulator 110, which in turn drives the power switch Qps associated with the power stage 105. Perturbations in the power supply output voltage Vout, propagated by load current or other nominal changes, causes the duty cycle provided by the pulse width modulator 110 to the power switch Qps to move in a direction that restores the power supply output voltage Vout to its rated or nominal value. This action thereby regulates the power supply output voltage Vout to its nominal or preset value during a steady state operating period of the power supply 100.

A non-steady state period of operation of the power supply 100 typically occurs during a power-on mode of operation or an initial phase of a fault-recovery mode of operation. During these non-steady state periods of operation, the power supply output voltage Vout is substantially zero and a control loop is formed by the pulse width modulator 110 and the integrated controller 115, which includes the primary control circuit 120 and the feedback circuit 125. As will be discussed more fully, operation of the control loop during the non-steady state periods provides for a substantially monotonic increase in the power supply output voltage Vout while maintaining an appropriate safety isolation for the power supply 100. This control mode of non-steady state operation generates a secondary bias voltage, which in turn allows a control mode of operation associated with a steady state period to both start and develop.

Figure 2:
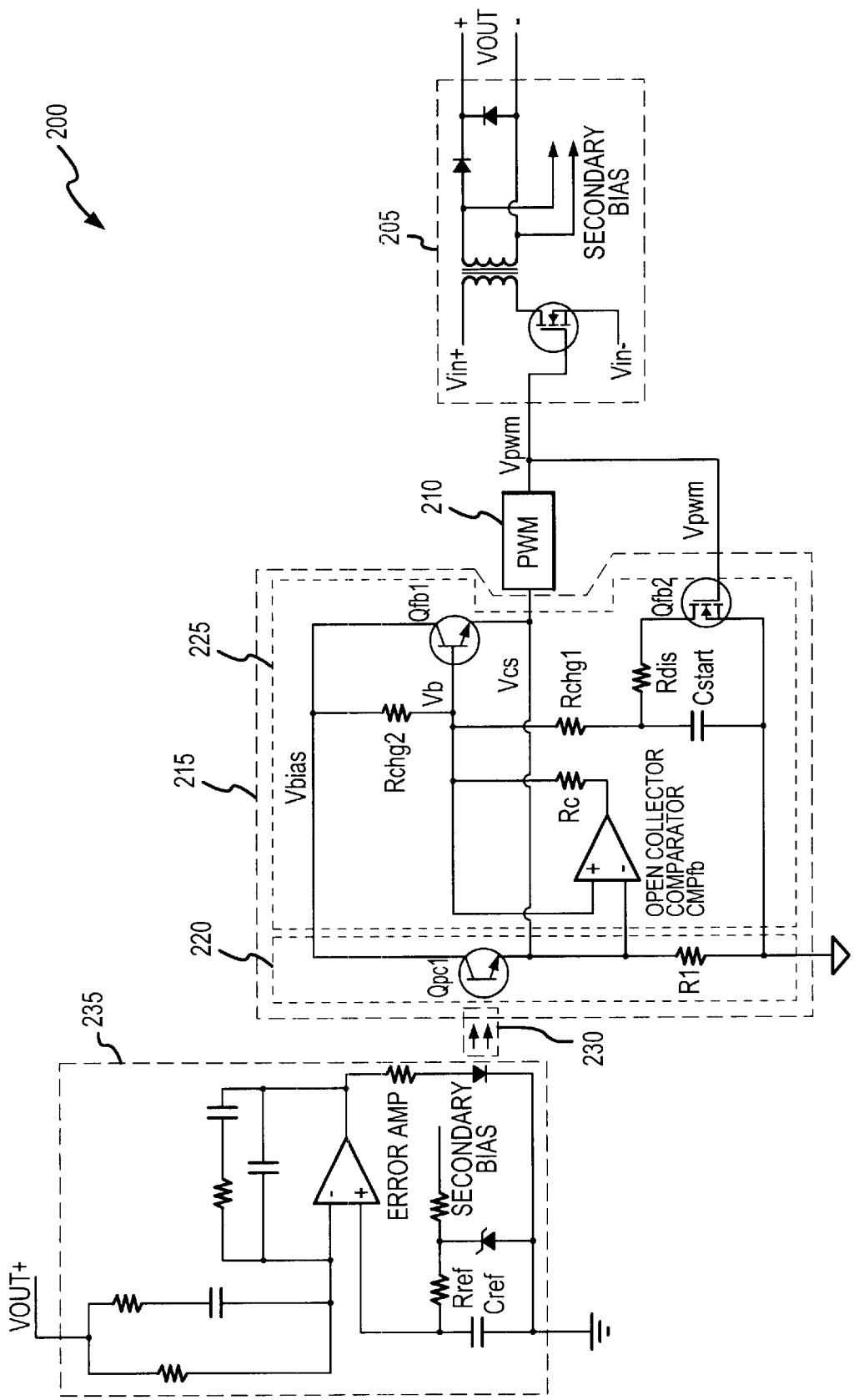
FIG. 2 illustrates a schematic diagram of another embodiment of a power supply constructed in accordance with the principles of the present invention.

Turning now to FIG. 2, illustrated is a schematic diagram of another embodiment of power supply, generally designated 200, employing an integrated controller 215 constructed in accordance with the principles of the present invention. The power supply 200 includes a pulse width modulator 210 and the integrated controller 215 includes a primary control circuit 220 and a feedback circuit 225. The integrated controller 215 may be used in a power supply employing the pulse width modulator 210 wherein the primary control circuit 220 is configured to provide a control signal (e.g., control signal voltage Vcs) to the pulse width modulator 210. Additionally, the feedback circuit 225 is configured to monitor an output signal (e.g., output signal voltage Vpwm) of the pulse width modulator 210 and to modify the control signal voltage Vcs provided by the primary control circuit 220. This signal will modify the control signal voltage Vcs provided to the pulse width modulator 210 and enable a substantially monotonic increase in a power supply output voltage Vout during a non-steady state period of operation of the power supply 200.

In the illustrated embodiment, the primary control circuit 220 is configured to be optically coupled to a secondary control circuit 235. The optical coupling between the primary control circuit 220 and the secondary control circuit 235 provides the equivalent of an isolation circuit 230 that electrically isolates the primary and secondary control circuits 220, 235. Additionally, the primary control circuit 220 includes an optically coupled controllable device Qpc1 (a transistor in the illustrated embodiment) and a resistor R1. As discussed with respect to the embodiment illustrated in FIG. 1, a steady state operating mode employs this optical coupling between the primary and secondary control circuits 220, 235 to appropriately regulate the power supply output voltage Vout.

During a non-steady state period of operation such as a power-on mode of operation or an initial phase of a fault-recovery mode of operation of the power supply 200, there is substantially no optical communication between the primary and secondary control circuits 220, 235. This condition results in a substantially zero contribution to the control signal voltage Vcs provided to the pulse width modulator 210 by the secondary control circuit 235. The feedback circuit 225 modifies this condition of the control signal voltage Vcs during this non-steady state period of operation to achieve a substantially monotonic increase in the power supply output voltage Vout.

The feedback circuit 225 generally includes a plurality of controllable devices (e.g., transistors) coupled to a comparator circuit. In the illustrated embodiment, the feedback circuit 225 specifically includes first and second feedback controllable devices Qfb1, Qfb2 and an open collector comparator CMPfb. The feedback circuit 225 also includes first and second charging resistors Rchg1, Rchg2, a discharge resistor Rdis, a comparator coupling resistor Rc and a capacitor Cstart. For either a condition of power-on or fault-recovery, a positive primary bias voltage Vbias is applied as shown in FIG. 2 causing a voltage Vb on the base of the first feedback controllable device Qfb1 to increase as the capacitor Cstart charges. Through the emitter follower action of the first feedback controllable device Qfb1, the control signal voltage Vcs also starts to increase.

The control signal voltage Vcs will continue to increase until it intersects a ramp timing voltage associated with the pulse width modulator 210. This action causes the pulse width modulator 210 to generate output pulses (output signal voltage Vpwm) with a duty cycle determined by the amount of intersection between the control signal voltage Vcs, the ramp timing voltage and any delay time through the pulse width modulator 210. The pulses representative of the output signal voltage Vpwm are fed back to the second feedback controllable device Qfb2, which starts to discharge the capacitor Cstart through the discharge resistor Rdis as the second feedback controllable device Qfb2 conducts. This negative feedback action lowers the control signal voltage Vcs and stabilizes the operation of the control loop of the power supply 200 thereby allowing the pulse width modulator 210 to operate in a skip-cycle mode (this mode of operation will be more fully discussed with respect to FIG. 3).

The pulse width modulator 210 will operate in the skip-cycle mode until a secondary bias voltage on a secondary side of a power stage 205 of the power supply 200 energizes the secondary control circuit 235 thereby causing the optically coupled controllable device Qpc1 in the primary control circuit 220 to conduct. As this action continues, the control signal voltage Vcs increases and thereby intersects the ramp timing voltage more deeply. The pulse width modulator 210 responds and moves from the skip-cycle mode to a consistent-cycle mode resulting in a longer duty cycle of the pulses representative of the output signal voltage Vpwm. This condition allows the second feedback controllable device Qfb2 to conduct longer thereby substantially discharging the capacitor Cstart, and the first feedback controllable device Qfb1 stops conducting. The open circuit comparator CMPfb senses this condition and effectively provides a latching action that isolates the feedback circuit 225 from the control signal voltage Vcs. At this point, the secondary control circuit 235, as part of an operating control loop, is controlling the power supply output voltage Vout and the feedback circuit 225 of the integrated controller 215 is substantially inoperative.

Figure 3:
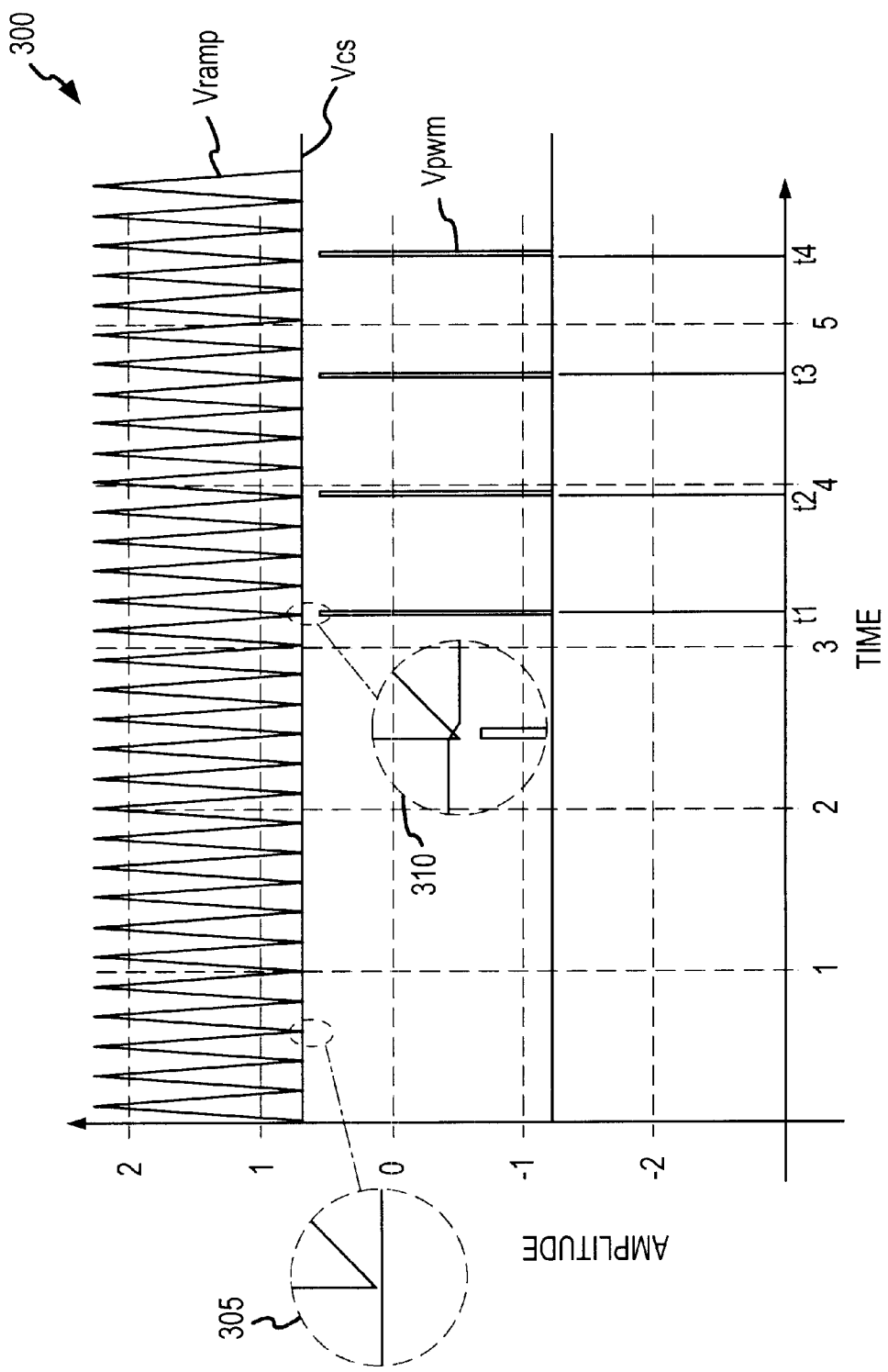
FIG. 3 illustrates a waveform diagram demonstrating exemplary operational characteristics of the power supply of FIG. 2.

Turning now to FIG. 3, illustrated is a waveform diagram, generally designated 300, demonstrating exemplary operational characteristics of the power supply 200 of FIG. 2. The waveform diagram 300 includes a waveform of a ramp timing voltage (Vramp) as may be associated with the pulse width modulator 210, a waveform of a control signal voltage (Vcs) as may be provided to the pulse width modulator 210 and a waveform of an output signal voltage (Vpwm) as may be representative of the pulses from the pulse width modulator 210. FIG. 3 also shows first and second enlarged waveform areas 305, 310.

The control signal voltage Vcs slowly increases until it reaches an appropriate point of intersection with the ramp timing voltage Vramp. The first enlarged waveform area 305 shows a relationship of the control signal voltage Vcs to the ramp timing voltage Vramp before they intersect. Then, the second enlarged waveform area 310 shows a relationship of the control signal voltage Vcs to the ramp timing voltage Vramp when they intersect, at a time t1. This causes a first output pulse of the output signal voltage Vpwm, which has a narrow duration, to be provided by the pulse width modulator 210. A feedback circuit, such as the feedback circuit 225, then momentarily decreases the control signal voltage Vcs due to this first output pulse. The control signal voltage Vcs then increases until it again appropriately intersects the ramp timing voltage Vramp about four cycles later at a time t2. A second output pulse of the output signal voltage Vpwm is produced at the time t2 and this skip-cycle mode of operation of the pulse width modulator 210 continues until the secondary control circuit 235 becomes energized by a secondary bias voltage.

Figure 4:
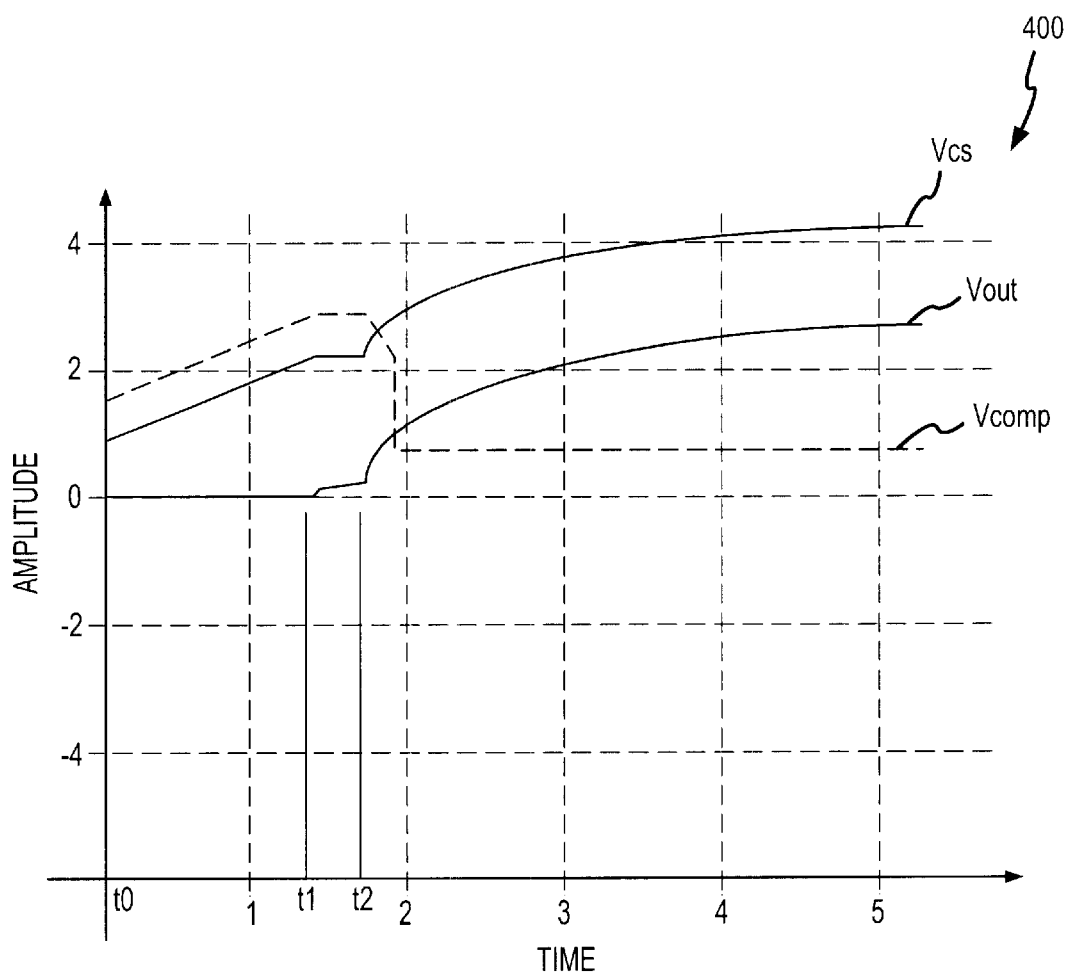
FIG. 4 illustrates a waveform diagram demonstrating exemplary operational characteristics associated with a power-on or a fault recovery mode of operation of an embodiment of a power supply constructed in accordance with the principles of the present invention.

Turning now to FIG. 4, illustrated is a waveform diagram, generally designated 400, demonstrating exemplary operational characteristics associated with a power-on or a fault recovery mode of operation of an embodiment of a power supply constructed in accordance with the principles of the present invention. The waveform diagram 400 includes a waveform of a power supply output voltage (Vout), a waveform of a control signal voltage (Vcs) as may be associated with a pulse width modulator and a waveform of a comparator output voltage (Vcomp) as may be employed in a feedback circuit.

At a time t0, the control signal voltage Vcs and the comparator output voltage Vcomp begin to increase. At a time t1, the control signal voltage Vcs intersects a ramp timing voltage associated with the pulse width modulator causing it to produce skip-cycle output pulses having a short duty cycle. After the time t1, a power stage of the power supply starts processing a small amount of energy, which eventually energizes a secondary control circuit. At a time t2, the pulse width modulator has an increased output pulse duty cycle thereby initiating a consistent-cycle mode of operation for the power supply. After the time t2, the power supply output voltage Vout increases monotonically to its rated value, and the comparator output voltage Vcomp decreases sharply thereby operationally allowing the secondary control circuit to solely control and regulate the power supply output voltage Vout.

In summary, embodiments employing an integrated controller, a method of operation thereof and a power supply constructed in accordance with the principles of the present invention have been presented. These embodiments employ a control network that integrates the function and performance of an independent bias supply with the main power train and control circuitry. This control technique may be referred to as an integrated controller having advantages that include the ability to provide an integrated start-up sequence (non-steady state period) of operation for a power supply having appropriate safety isolation.

This start-up sequence employs a pulse width modulator that yields a substantially monotonic increase in an output voltage of the power supply. Such a substantially monotonic increase in output voltage at turn-on and fault recovery is increasingly preferable by integrated circuit devices connected to the output voltage, such as application specific integrated circuits, memory integrated circuit and processors, for example. The present invention overcomes the situation where an independent circuit, separate from the power supply, is typically employed to obtain a similar result. Penalties, for this conventional approach, may occur in the areas of cost, size, safety and overall efficiency when compared to the integrated solution of the present invention.

Although the present invention has been described in detail, those skilled in the art should understand that they can make various changes, substitutions and alterations herein without departing from the spirit and scope of the invention in its broadest form.

What is claimed is:

1. An integrated controller for use with a power supply employing a pulse width modulator, comprising:
   a primary control circuit configured to provide a control signal to said pulse width modulator; and
   a feedback circuit configured to monitor an output signal of said pulse width modulator and to modify said control signal to enable a substantially monotonic increase in an output voltage of the power supply during a non-steady state period of operation thereof.

2. The integrated controller as recited in claim 1 wherein said primary control circuit is configured to be optically coupled to a secondary control circuit.

3. The integrated controller as recited in claim 1 wherein said primary control circuit comprises an optically coupled controllable device and a resistor.

4. The integrated controller as recited in claim 1 wherein said feedback circuit comprises a plurality of controllable devices coupled to a comparator circuit.

5. The integrated controller as recited in claim 1 wherein said feedback circuit is configured to cause said pulse width modulator to operate in a skip-cycle mode.

6. The integrated controller as recited in claim 1 wherein said non-steady state period comprises an initial phase of a power-on mode of operation of said power supply.

7. The integrated controller as recited in claim 1 wherein said non-steady state period comprises an initial phase of a fault-recovery mode of operation of said power supply.

8. A method of operating a power supply employing a pulse width modulator, comprising:

providing a control signal to said pulse width modulator;

monitoring an output signal of said pulse width modulator; and modifying said control signal to enable a substantially monotonic increase in an output voltage of the power supply during a non-steady state period of operation thereof.

9. The method as recited in claim 8 wherein said providing is performed by a primary control circuit.

10. The method as recited in claim 9 wherein said primary control circuit comprises an optically coupled controllable device and a resistor.

11. The method as recited in claim 8 wherein said modifying is performed by a feedback circuit comprising a plurality of controllable devices coupled to a comparator circuit.

12. The method as recited in claim 8 wherein said modifying causes said pulse width modulator to operate in a skip-cycle mode.

13. The method as recited in claim 8 wherein said non-steady state period comprises an initial phase of a power-on mode of operation of said power supply.

14. The method as recited in claim 8 wherein said non-steady state period comprises an initial phase of a fault-recovery mode of operation of said power supply.

15. A power supply, comprising:

a power stage that provides an output voltage;

a pulse width modulator that provides an output signal to a power switch of said power stage;

an integrated controller, including:

a primary control circuit that provides a control signal to said pulse width modulator, and a feedback circuit that monitors said output signal of said pulse width modulator and modifies said control signal to enable a substantially monotonic increase in said output voltage during a non-steady state period of operation of said power supply; and a secondary control circuit that is coupled to an output of said power supply and coupled to said integrated controller.

16. The power supply as recited in claim 15 wherein said primary control circuit includes an optically coupled controllable device and a resistor.

17. The power supply as recited in claim 15 wherein said feedback circuit includes a plurality of controllable devices coupled to a comparator circuit.

18. The power supply as recited in claim 15 wherein said feedback circuit causes said pulse width modulator to operate in a skip-cycle mode.

19. The power supply as recited in claim 15 wherein said non-steady state period includes an initial phase of a power-on mode of operation of said power supply.

20. The power supply as recited in claim 15 wherein said non-steady state period includes an initial phase of a fault-recovery mode of operation of said power supply.

* * * * *